United States Patent
Seto et al.

[11] Patent Number: 5,827,148
[45] Date of Patent: Oct. 27, 1998

[54] VARIABLE SPEED DRIVE UNIT FOR ELECTRIC VEHICLE AND VARIABLE SPEED DRIVING METHOD

[75] Inventors: Takeshi Seto; Akihito Uetake; Tatsuya Shimoda, all of Nagano; Masao Ono, Kanagawa; Masatoshi Fukuda, Kanagawa; Satoshi Yamazaki, Kanagawa, all of Japan

[73] Assignees: Seiko Epson Corporation; Tokyo R & D Co., Ltd., both of Tokyo, Japan

[21] Appl. No.: 785,319

[22] Filed: Jan. 21, 1997

[30] Foreign Application Priority Data

Jan. 23, 1996 [JP] Japan .................................. 8-008977

[51] Int. Cl.⁶ .................................................. H02P 17/00
[52] U.S. Cl. ............................................ 477/15; 74/336 R
[58] Field of Search ............................... 477/7, 8, 12, 13, 477/14, 15, 20; 180/65.7; 192/48.2, 84.2, 84.21, 84.31, 84.92; 74/336 R

[56] References Cited

U.S. PATENT DOCUMENTS

| | | | |
|---|---|---|---|
| 2,692,511 | 10/1954 | Nallinger | 74/336 R |
| 2,919,594 | 1/1960 | Patrignani et al. | 477/15 |
| 2,927,474 | 3/1960 | Péras | 74/336 R |
| 2,969,134 | 1/1961 | Wiedmann et al. | 192/84.92 |
| 3,239,038 | 3/1966 | Péras | 74/336 R |
| 3,896,914 | 7/1975 | Konsbruck et al. | 477/15 |
| 3,898,893 | 8/1975 | Hashimoto et al. | 477/15 |
| 4,509,629 | 4/1985 | Pajgrt et al. | 477/8 |
| 5,395,293 | 3/1995 | Matsuura et al. | 477/15 |
| 5,498,216 | 3/1996 | Bitsche et al. | 477/20 |

*Primary Examiner*—Charles A. Marmor
*Assistant Examiner*—Sherry Lynn Estremsky
*Attorney, Agent, or Firm*—Kanesaka & Takeuchi

[57] ABSTRACT

In an electric vehicle provided with an electric motor (M), a motor drive circuit (17) and a control circuit section (15) for outputting an operation command to the motor drive circuit, a variable speed drive unit for electric vehicles has a transmission apparatus (20) which engages or disengages a drive shaft (7a) which receives the drive force from a propelling motor and a driven shaft (5a) which is interconnected with propelling wheels by an electromagnetic engagement clutch (30), the transmission apparatus has the electromagnetic clutch comprised of a first clutch (22) interconnected with the drive shaft, a second clutch (25) having a rotational speed different from the first clutch, and an output side clutch (21) interconnected with the driven shaft; and the output side clutch and the first clutch or the second clutch are alternatively connected to selectively change the motor output. And, to connect the clutches mutually, the rotational speed of the clutch on the drive side is synchronized with the rotational speed of the clutch on the driven side.

2 Claims, 9 Drawing Sheets

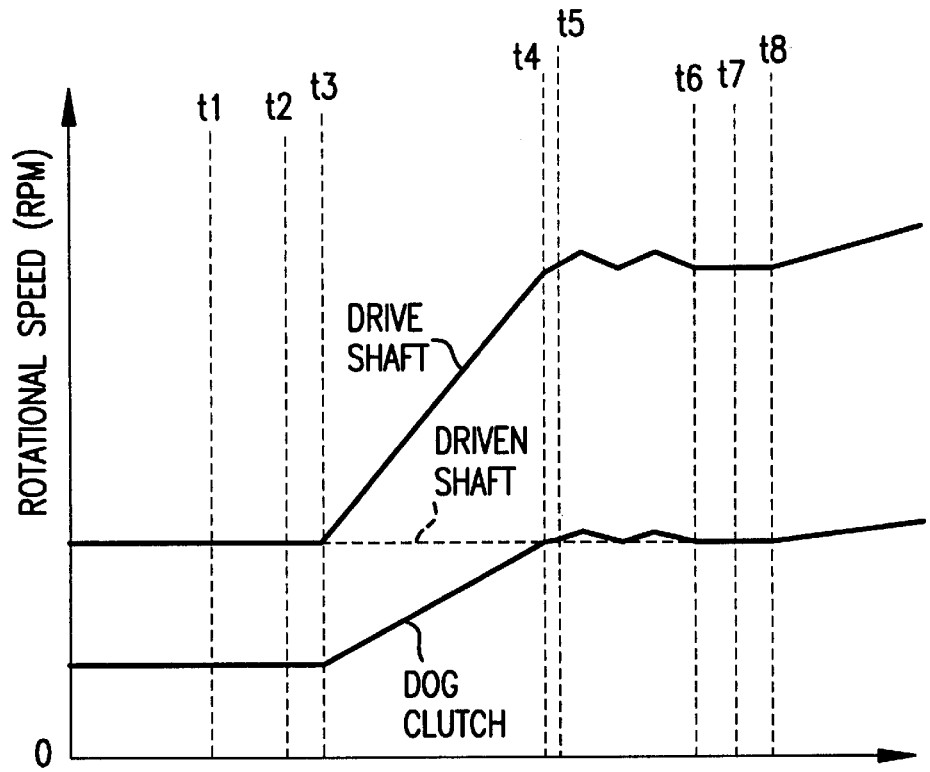
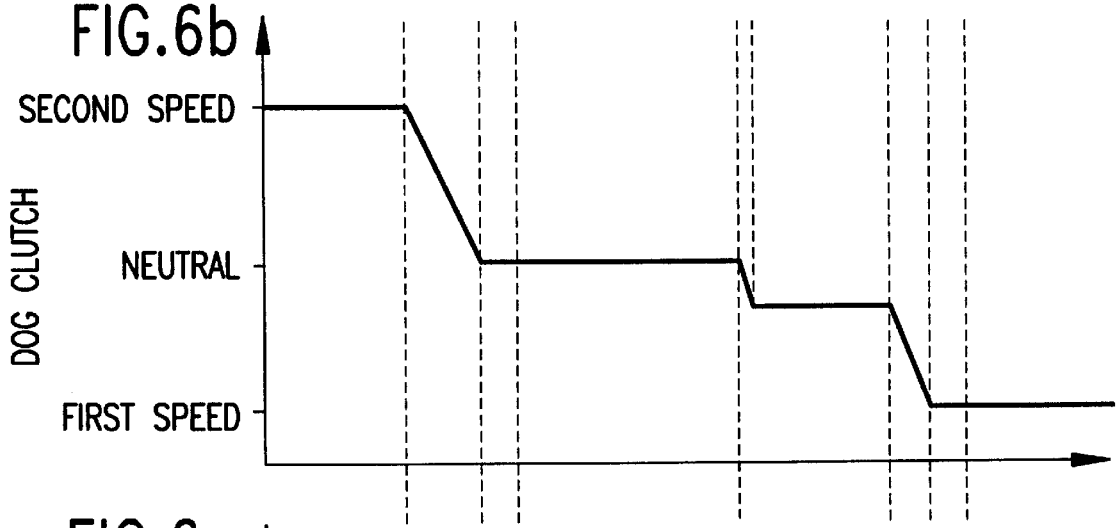
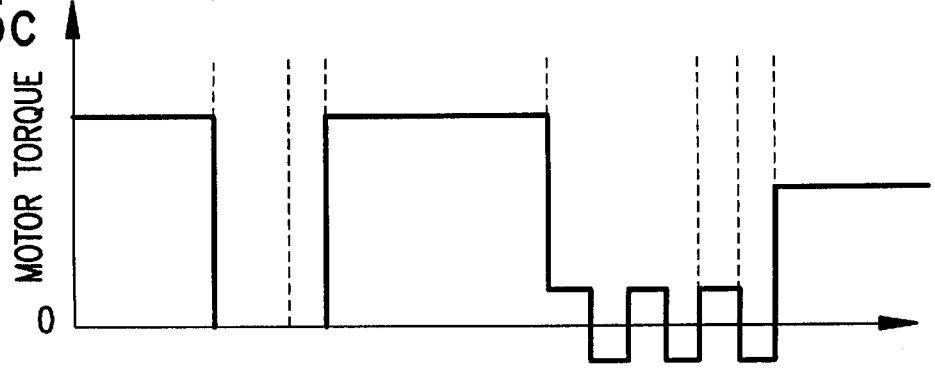

VARIABLE SPEED DRIVE UNIT FOR ELECTRIC VEHICLE AND VARIABLE SPEED DRIVING METHOD

BACKGROUND OF THE INVENTION

1. Field of the Invention

The present invention relates to a variable speed drive unit using dog clutches for an electric vehicle and a variable speed drive method, and particularly to the improvement of such clutches in engagement and disengagement.

2. Description of Prior Art

As a next-generation alternative vehicle for internal combustion engine vehicles such as gasoline automobiles, an electric vehicle using a propelling electric motor is attracting attention. It is said that the electric vehicle which uses a clean electric energy can completely remedy the environmental problems such as harmful noises and exhaust gases, which are about 70% of the causes for the environmental pollution, derived from the internal combustion engine vehicles, and can extend by two times or more the resource life of fossil fuel such as petroleum.

The electric vehicle has propelling wheels suspended by a shock absorber from the vehicle body in the same way as a conventional gasoline automobile and is propelled by a power transmission device with an electric motor as the drive source. And, the electric motor has power supplied by a power supply. In other words, this electric power unit comprises a battery power supply unit using a plurality of storage batteries, a power supply circuit for supplying stable electric power, an electric motor for propelling, a motor driving circuit for directly controlling the propelling power of the motor, and a control circuit for outputting an operation command or the like to the motor driving circuit. And, the motor-driven power from the motor is transmitted to the propelling wheels via a power transmission to drive the vehicle in the same way as a conventional vehicle.

Such a power transmission is a synchromesh transmission which has been used for the conventional gasoline automobiles. And, as an automatic transmission mechanism, a hydraulic transmission using a torque converter is mainly used, and a non-stage transmission using a friction belt is known in addition thereto.

The synchromesh transmission comprises by providing a plurality of gear mechanisms consisting of gear trains having a different gear ratio, and connecting the output gear on the motor drive side to the input gear of the gear mechanism selected by an occupant by mechanically engaging them. In other words, rotational clutch discs are disposed to oppose the output shaft of the motor and the input shaft of each gear mechanism, one of the rotational clutch discs is contacted to and separated from the other to mechanically contact or separate for engagement or disengagement, and the gear trains having a different gear ratio are driven to change a speed. And, such a clutch is manipulated by means of a cam, lever and link manually operated by an occupant, and the clutch operation is made at the discretion of the occupant depending on a driving condition.

A continuously variable transmission (CVT) has a drive pulley on the motor side and a driven pulley on the propelling wheel side, loops a belt over both pulleys, and transmits the motor-driven power to the propelling wheels by a frictional force between the belt and the pulleys. And, by continuously increasing or decreasing the diameter of one of the pulleys, a rotation diameter ratio of the pulleys is continuously changed to change the input motor speed.

The electric vehicle can achieve a driving mechanism without using a transmission by using the wide range turning force of a motor. But, when a transmission is not provided, a high power motor which can cover from a low speed to a high speed must be used, resulting in disadvantages that the motor becomes large and the motor efficiency is deteriorated because a low efficient range of the motor's low speed output range is used.

And, since the hydraulic transmission using a torque converter and the non-stage transmission using a friction belt have a large transmission loss, they are not suitable for the electric vehicle which needs a high efficiency. For example, the continuously variable transmission, which uses a frictional force between the belt and the pulleys, slips to some extent during transmitting resulting in a transmission loss, and the hydraulic transmission, which transmits power by means of a fluid, is not expected to provide a high efficiency.

On the other hand, the synchromesh transmission which is generally used as a manual transmission has a very complex structure, and disadvantageously mounted in an automobile. In other words, since it has a mechanism of using a frictional force or the like to forcedly match a driven speed with a drive speed, a substantially large pushing pressure is required to supply a frictional force sufficient to keep them contacted. Therefore, it has a disadvantage that a large powerful actuator for supplying the pressure is required.

Thus, the above-described respective methods have disadvantages in view of efficiency and cost. On the other hand, the dog clutch, which obtains the motor power decreased to a prescribed speed by engaging with the transmission gear shaft arbitrarily decreased in speed, has a good transmission efficiency and a simple and inexpensive structure, and is optimum for the electric vehicle. But, it has a disadvantage that clutch engagement/disengagement performance is low.

Specifically, as shown in FIG. 8a and 8b, the dog clutch has an engagement mechanism in which teeth 51a of a dog clutch 51 on a connection side are engaged with a fitting section formed of teeth 52a of a dog clutch 52 on a connected side, and a small clearance w is generally provided. To engage both dog clutches, the teeth of one dog clutch are opposed to the fitting section of the other dog clutch as described above, but it is very difficult to make the opposed positioning. Therefore, the small clearance w is provided as an allowable deviation space at the time of positioning, but even when the clearance w is taken into account, the smooth fitting of the dog clutches is seldom made in view of the probability. As shown in FIG. 9a and 9b, the leading ends of the teeth 51a, 52a of the opposed dog clutches 51, 52 are generally bumped mutually, and the teeth 51a, 52a are displaced in sliding contact to be mutually engaged by a relative rotational speed difference between the dog clutches 51, 52.

Therefore, when the clutches are to be engaged, an impact due to the difference of speed between both dog clutches occurs often, and particularly when the shift is downed from the high-speed running on the second-speed side to the low-speed running on the first-speed side, an uncomfortable shock which is felt when the brake is operated is caused often.

SUMMARY OF THE INVENTION

In view of above, the present invention aims to provide a transmission apparatus, which is very efficient and inexpensive, for the electric vehicle by using a dog clutch which has engagement/disengagement performance improved.

According to an aspect of the invention there is provided an electric vehicle provided with an electric motor for propelling, a motor drive circuit for controlling the drive power of the motor, and a control circuit section for outputting an operation command to the motor drive circuit, in which a variable speed drive unit for the electric vehicle is characterized by having a transmission apparatus which engages or disengages a drive shaft which receives the drive force from the propelling motor and a driven shaft which is interconnected with propelling wheels by an electromagnetic engagement clutch, wherein the transmission apparatus has the electromagnetic clutch comprised of a first clutch interconnected with the drive shaft, a second clutch having a rotational speed different from the first clutch, and an output side clutch interconnected with the driven shaft; and the output side clutch and the first clutch or the second clutch are alternatively connected to selectively change the motor output.

By configuring as described above, the electromagnetic clutch which is good in transmission efficiency, simple in structure and inexpensive can be applied for the electric vehicle. Besides, since the clutch is electrically engaged or disengaged by electromagnetic force, the clutch operation performance can be improved by electrically coordinating with the motor. Therefore, as compared with the hydraulic transmission and the continuously variable transmission, high efficiency in transmission performance can be achieved.

According to another aspect of the invention there is provided an electric vehicle provided with an electric motor for propelling, a motor drive circuit for controlling the drive power of the motor, and a control circuit section for outputting an operation command to the motor drive circuit, in which a variable speed drive unit for the electric vehicle is characterized by having a transmission apparatus which engages or disengages a drive shaft which receives the drive force from a traveling motor and a driven shaft which is interconnected with propelling wheels by an electromagnetic engagement clutch, wherein the transmission apparatus has the electromagnetic clutch comprised of a first clutch interconnected with the drive shaft, a second clutch having a rotational speed different from the first clutch, and an output side clutch interconnected with the driven shaft; the first clutch and the second clutch are opposed to each other, and the output side clutch is disposed between the first and second clutches so as to be connectable to or separable from the first and second clutches; and the output side clutch and the first clutch or the second clutch are alternatively connected to selectively change the motor output.

By configuring as described above, in the same way as the above aspect, the transmission apparatus can be configured by the only electromagnetic clutch which is simple in structure, produced inexpensively and good in durability. Besides, in the same way as described above, as compared with the hydraulic transmission and the continuously variable transmission, high efficiency in transmission performance can be achieved.

And, since the clutch is electrically engaged or disengaged by the electromagnetic force, the clutch operation performance can be improved by electrically coordinating with the motor. Besides, the first clutch and the second clutch are opposed, and between these first and second clutches, the output-side clutch is rationally disposed to be allowed to be contacted to or separated from the first and second clutches.

According to still another aspect of the invention there is provided an electric vehicle provided with an electric motor for propelling, a motor drive circuit for controlling the drive power of the motor, and a control circuit section for outputting an operation command to the motor drive circuit, in which a variable speed drive unit for the electric vehicle is characterized by having a transmission apparatus which engages or disengages a drive shaft which receives the drive force from the propelling motor and a driven shaft which is interconnected with propelling wheels by an electromagnetic engagement clutch, the electromagnetic clutch being comprised of a first clutch interconnected with the drive shaft, a second clutch having a rotational speed different from the first clutch, and an output side clutch interconnected with the driven shaft; and the output side clutch and the first clutch or the second clutch are alternatively connected to selectively change the motor output, wherein the variable speed drive unit further having: a first sensor for detecting a rotational speed of the drive shaft, a second sensor for detecting a rotational speed of the driven shaft, and a synchronization speed judging control which receives signals from the first and second sensors, compares the rotational speed of the first or second clutch with the rotational speed of the output side clutch, and synchronizes the rotational speed of the first or second clutch with the rotational speed of the output side clutch; and releasing the clutch engagement at the time of shifting gears, synchronizing the rotational speed of the first or second clutch with the rotational speed of the output side clutch by the synchronization speed judging control, or by the control circuit section according to a signal it has received from the synchronization speed judging control, and engaging the first or second clutch with the output side clutch.

By configuring as described above, in addition to the actions and effects of the above aspects, the motor's torque and speed can instantaneously be changed to an appropriate level and controlled in response to clutch operation signals at the time of clutch engagement/disengagement operation, so that the moving clutches can be engaged, connected or separated smoothly. And, a secure and comfortable clutch operation feeling can be obtained, and the clutch engagement/disengagement performance can be improved.

According to yet another aspect of the invention there is provided a variable speed driving method for an electric vehicle provided with an electric motor for propelling, a motor drive circuit for controlling the drive power of the motor, and a control circuit section for outputting an operation command to the motor drive circuit, which is characterized by: having a transmission apparatus which engages or disengages a drive shaft which receives the drive force from the propelling motor and a driven shaft which is interconnected with propelling wheels by an electromagnetic engagement clutch, wherein the transmission apparatus has the electromagnetic clutch comprised of a first clutch interconnected with the drive shaft, a second clutch having a rotational speed different from the first clutch, and an output side clutch interconnected with the driven shaft; and releasing an operation command to the motor drive circuit at the time of shifting gears to release the clutch engagement, reissuing an operation command to the motor drive circuit to synchronize the rotational speed of the first or second clutch with the rotational speed of the output side clutch, and engaging the first or second clutch with the output side clutch.

Releasing of the operation command means that the motor is put under a free run state without supplying electric power to the motor at all, or the motor is kept in a rotating state with electric power supplied so that the motor itself can keep its speed just before the release, and the motor's output torque is lowered to zero or minimum as described afterward.

Therefore, in the same way as the above aspect, the motor's torque and speed can instantaneously be changed to an appropriate level and controlled in response to clutch operation signals at the time of clutch engagement/disengagement operation, so that the moving clutches can be engaged, connected or separated smoothly. And, a secure and comfortable clutch operation feeling can be obtained, and the clutch engagement/disengagement performance can be improved.

According to still another aspect of the invention there is provided a variable speed driving method for an electric vehicle provided with an electric motor for propelling, a motor drive circuit for controlling the drive power of the motor, and a control circuit section for outputting an operation command to the motor drive circuit, which is characterized by: having a transmission apparatus which engages or disengages a drive shaft which receives the drive force from the propelling motor and a driven shaft which is interconnected with propelling wheels by an electromagnetic engagement clutch, wherein the transmission apparatus has the electromagnetic clutch comprised of a first clutch interconnected with the drive shaft, a second clutch having a rotational speed different from the first clutch, and an output side clutch interconnected with the driven shaft; and releasing an operation command to the motor drive circuit at the time of shifting gears to release the clutch engagement, reissuing an operation command to the motor drive circuit to increase the rotational speed of the first or second clutch slightly faster than the rotational speed of the output side clutch, and engaging the first or second clutch with the output side clutch.

By configuring as described above, since the rotational speed is slightly different between the clutches to be engaged, reliability of the connection by engagement can be improved. And, since the rotational speed difference is determined that the rotational speed of the clutch on the drive side for connection is slightly higher than the rotational speed of the clutch on the driven side, a direction in which a shock of connecting the clutches is produced can be directed in a driving direction, enabling to relieve an annoying feeling at the time of changing the speed.

According to still another aspect of the invention there is provided a variable speed driving method for an electric vehicle provided with an electric motor for propelling, a motor drive circuit for controlling the drive power of the motor, and a control circuit section for outputting an operation command to the motor drive circuit, which is characterized by: having a transmission apparatus which engages or disengages a drive shaft which receives the drive force from the propelling motor and a driven shaft which is interconnected with propelling wheels by an electromagnetic engagement clutch, wherein the transmission apparatus has the electromagnetic clutch comprised of a first clutch interconnected with the drive shaft, a second clutch having a rotational speed different from the first clutch, and an output side clutch interconnected with the driven shaft; and further having means for adding the speed changing control in a prescribed cycle with the rotational speed of the output side clutch as the lower limit to the synchronized rotation of the first or second clutch, and judging, when a speed control error in the speed changing control becomes a prescribed value or higher, that the first or second clutch has been engaged with the output side clutch.

By configuring as described above, at the time of connecting the clutches, the speed of the motor which has its output torque restricted is varied to detect that the variation of the motor speed is not controlled as expected and to judge that the clutch connection has been completed, so that the completion of the clutch connection can be judged without any sensor.

And, since a sensor for detecting the clutch position and electric wiring for connecting the sensor to the control circuit section are not required, the cost can be decreased, and since a sensor is not required to be provided in the neighborhood of the clutch where the operation environment is severe for the sensor, reliability of the transmission can be improved.

BRIEF DESCRIPTION OF THE DRAWINGS

FIGS. 6a, 6b, and 6c are time charts for showing the operation procedures related to the transmission apparatus for the electric vehicle in a third embodiment; (a) is a speed chart showing the rotational speed of each shaft, (b) is a state diagram showing the operation position state of the driven dog clutch, and (c) is an output chart showing the output torque state of a motor;

DESCRIPTION OF THE PREFERRED EMBODIMENT

Figure 1:
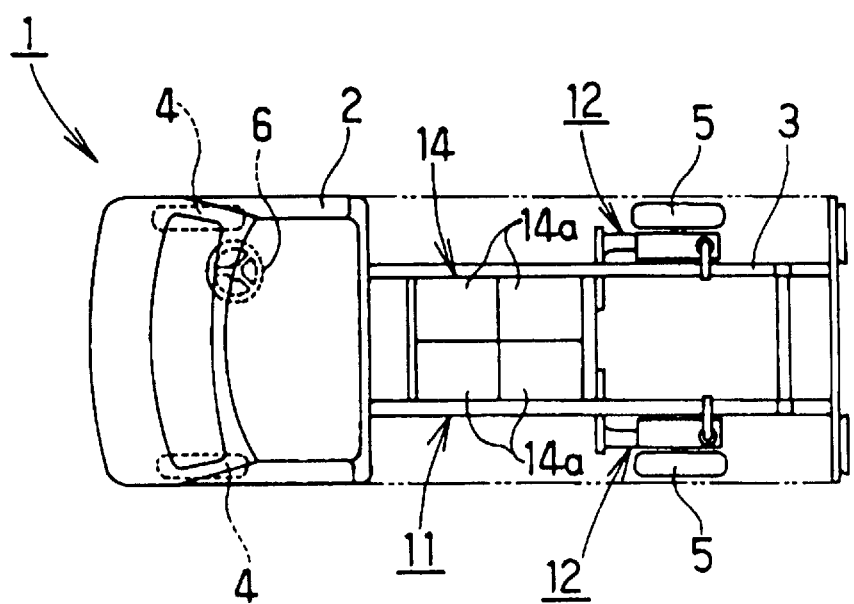
FIG. 1 is a plan view for showing a schematic general structure of an electric-motor four-wheel car which is one example of the electric vehicle according to the invention.

Now, the present invention will be described with reference to the specific embodiments shown in FIG. 1 to FIG. 7. The electric vehicle of the respective specific embodiments will be described by referring to an electric-motor four-wheel car which is one type of the electric vehicle. And, the electric-motor four-wheel car to be described has a basic structure which is the same as those to be referred to in the respective embodiments to be described afterward.

Specifically, an electric vehicle 1 has propelling wheels 4, 5 at the front and rear of a vehicle body 2 and suspended from a main frame 3 of the vehicle body. And, the front wheels 4 are steered by a steering wheel 6, and the rear wheels 5 are not driven by an engine but by electric motors for propelling.

The main frame 3 has an electric power unit 11 for supplying electric power for traveling and drive units 12 which convert electric energy supplied by the electric power unit 11 into a mechanical motion by a DC motor for traveling and transmitting to the rear wheels 5.

The electric power unit 11 comprises a battery power supply 14 mounted on the main frame 3 of the vehicle body 2, unillustrated equipment such as a residual capacity meter, a power supply circuit, a control circuit section, a motor drive circuit, a charger and various types of sensors attached to such mounted equipment.

The battery power supply 14 comprises a group of storage batteries 14a, 14a, . . . fixed to the frame by brackets, and such storage batteries 14a are mutually connected in series through a cable not having a high electric power transmission loss so that a prescribed voltage can be obtained. And, the electric power from the battery power supply 14 is stabilized by the power supply circuit, supplied to the motor drive circuit, and distributed to respective on-board equipment. The motor drive circuit has an MOS-FET circuit which is a switching element and performs chopper control by the switching operation of the FET circuit to increase or decrease an effective voltage which is supplied to the motors for propelling, thereby controlling the motor outputs such as a rotational speed and torque. And, the switching control of the motor drive circuit is performed by the control command outputted from the control circuit section according to an accelerator angle, a traveling speed of the vehicle and the like directed by a driver.

The control circuit section comprises a microcomputer which receives signals from the sensors attached to the accelerator and the on-board equipment and outputs an operation command to the motor drive circuit or the like. This microcomputer has an A/D converter for converting respective input signals into digital signals, I/O ports, a CPU, a memory and the like, processes according to a program stored in the memory on the basis of an accelerator angle by the driver and detected signals from a speed sensor and the like, outputs an appropriate operation command to the motor drive circuit and a transmission device 20 in the drive unit 12 (see FIG. 2) to be described afterward, and at the time of changing the speed, controls the motor output and the clutch operation by the transmission device 20.

The drive unit 12 mainly comprises a propelling motor and the transmission device 20, and transmits the power of the traveling motor to the rear wheels 5 through the transmission device 20 which is in the second-speed or first-speed operation mode selected according to a traveling condition. And, the drive unit 12 is mounted on the vehicle frame 3 via a damper which is not illustrated.

Accordingly, when the driver turns on a main key switch, the power supply circuit operates, electric power is supplied from the battery power supply to respective on-board equipment, and the vehicle can be started to move. Then, when the driver operates the accelerator, the control circuit section instructs the motor drive circuit to make an appropriate motor output operation accordingly. Based on the operation instruction, the motor drive circuit increases or decreases the electric power supplied to the propelling motor in the drive unit 12 to adjust the output of the traveling motor. And, the motor output thus produced is converted into appropriate torque according to the operation mode of the transmission device 20 and transmitted to the rear wheels 5 to run the electric vehicle 1 at a speed desired by the driver.

Figure 2:
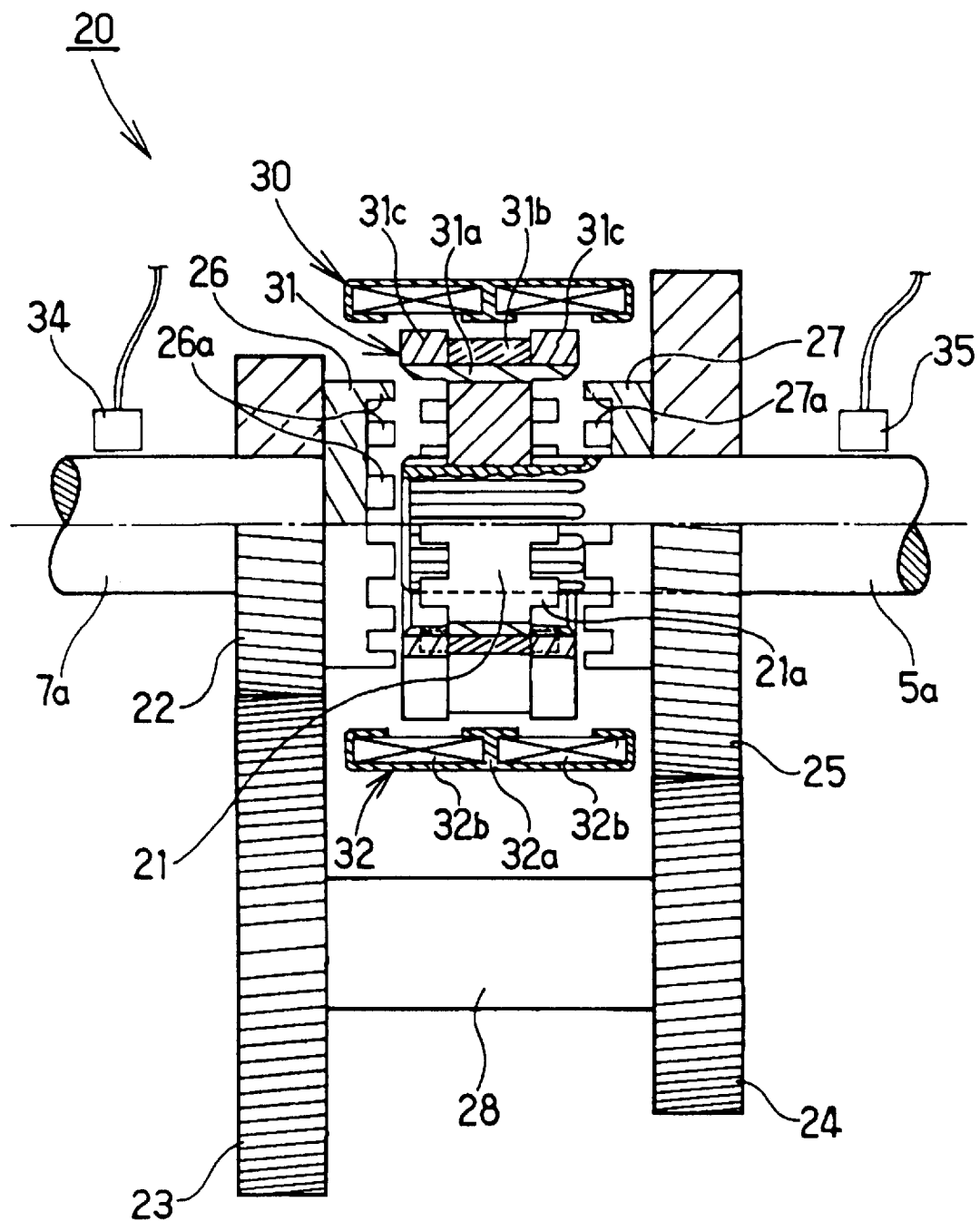
FIG. 2 is a plan view for showing one example of a transmission apparatus for the electric vehicle according to the invention, with its part broken.

The transmission device 20 is disposed between a motor output shaft 7a and a rear wheel shaft 5a which are supported by unillustrated bearings and mutually provided on the same axis as shown in FIG. 2. The motor power is entered from the motor output shaft 7a on the drive side and outputted to the rear wheel shaft 5a on the driven side. Specifically, the motor output shaft 7a on the drive side is connected to the electric motor for propelling not shown, and the rear wheel shaft 5a on the driven side is similarly connected to the rear wheels 5 not shown. Therefore, the drive force produced by the motor is first transmitted to the transmission device 20, converted to appropriate torque/number of revolutions by the transmission device 20 depending on the traveling condition, and transmitted to the rear wheel shaft 5a to drive the rear wheels 5 of the rear wheel shaft 5a, thereby traveling the vehicle.

In this embodiment, the transmission device 20 has between the motor output shaft 7a and the rear wheel shaft 5a a second-speed revolution gear 22 which is directly connected to the motor output shaft 7a, speed reduction gears 23, 24 which are engaged with the second-speed revolution gear 22 and have a prescribed reduction gear ratio, and a first-speed revolution gear 25 which is engaged with the speed reduction gear 24 and freely rotate supported by the driven shaft 5a. And, it further has a dog clutch 21 on the driven side which is spline-connected to the driven shaft 5a directly connected to the propelling wheels 5 and disposed to be movable in the longitudinal direction of the shaft 5a, and dog clutches 26, 27 on the drive side opposed to the dog clutch 21. Reference numeral 28 denotes a gear shaft which connects the speed reduction gears 23, 24.

The dog clutch 21 on the driven side has clutch teeth 21a formed at prescribed intervals on the circumference at both ends in the axial direction thereof. And, the dog clutches 26, 27 on the drive side are fixed to the side faces of the second-speed revolution gear 22 and first-speed revolution gear 25, and have clutch teeth 26a, 27a which are engageable with the clutch teeth 21a of the dog clutch 21 on the driven side.

The second-speed revolution gear 22 is fixed to the motor output shaft 7a which is directly connected to the motor as described above. With the dog clutch 26 fixed to the second-speed revolution gear 22, the dog clutch 21 on the driven shaft 5a side is engaged to connect the motor output shaft 7a to the driven shaft 5a, so that the revolution output of the motor can be transmitted directly to the driven shaft 5a. Therefore, when the vehicle is driven in the second-speed range, the high revolution output of the motor can efficiently be transmitted to the driven shaft 5a, namely the propelling wheels 5.

And, the first-speed revolution gear 25 is connected to the second-speed revolution gear 22 via the speed reduction gears 23, 24 which are sequentially engaged, and the motor revolution output is lowered to a prescribed ratio by the gear ratio determined by these speed reduction gears 23, 24 to drive the first-speed revolution gear 25. Therefore, when the vehicle is to be driven at a low speed, the dog clutch 21 on the driven shaft 5a side is engaged with the dog clutch 27 of the first-speed revolution gear 25 to decrease the motor output when the motor is rotated normally and to efficiently transmit to the driven shaft 5a side, so that the motor is not required to be rotated at an extremely low speed, and the motor performance can be exerted well.

The dog clutches 21, 26, 27 will be described in further detail. These clutches are one type of jaw clutches. The dog clutch 21 has on both faces in the axial direction the clutch teeth 21a, 21a in the form of a square projection intermittently along the circumference with the driven shaft 5a at the center. The dog clutches 26, 27 of the second-speed and first-speed revolution gears 22, 25 opposed thereto also have the similar clutch teeth 26a, 27a in the form of a square projection intermittently. Specifically, these teeth 21a, 26a, 27a have a sectional shape in the axial direction of a perfect square or a broad leading end with a narrow base, and in the latter case (the broad leading end with the narrow base), the teeth are not separated easily when they are engaged.

Therefore, when the dog clutch 21 moves to the second-speed or first-speed revolution gear 22, 25, the clutch teeth 21a are engaged with the clutch teeth 26a, 27a of the second-speed or first-speed dog clutch 26, 27, so that the driven shaft 5a can be mechanically connected to the second-speed or first-speed gear 22, 25 via the dog clutch 21. And, when such engagement has been completed, a thrust force in the axial direction is not produced therebetween because the sectional shape of the teeth in the axial direction is different from a common gear and square at least, thereby eliminating the necessity of a pushing force to keep the engaged state.

As a method to move the dog clutch, a three position type permanent magnet actuator 30 is used. This actuator 30 has a clutch moving unit 31 and a clutch drive unit 32 which is provided around the clutch moving unit 31. The clutch moving unit 31 is fixed to the outer circumference of the dog clutch 21 via a non-magnetic ring 31a and has a permanent magnet 31b and pole pieces 31c. The clutch drive unit 32 has excitation coils 32b built into a yoke 32a. The clutch moving unit 31 is designed to be moved to a prescribed position by an electromagnetic force produced by the clutch drive unit 32.

In further detail, on the outer circumference of the dog clutch 21, the clutch moving unit 31 which comprises the ring-shaped permanent magnet 31b fixed via the non-magnetic ring 31a and the pole pieces 31c, 31c fixed to both ends in the axial direction of the permanent magnet 31b is provided as described above. The permanent magnet 31b is magnetized to have prescribed N/S poles in the axial direction. And, the electromagnetic force is acted on the permanent magnet 31b from the clutch drive unit 32 in order to move the dog clutch 21 which has the clutch moving unit 31 fixed in an arbitrary axial direction containing a neutral position, thereby performing an intermittent operation toward the second-speed side and the first-speed side at both ends and a fixing operation at the center neutral position (neutral) as the moving embodiments.

The clutch drive unit 32 is a cylinder larger than the outer diameter of the clutch moving unit 31, and comprises the yoke 32a which is a soft magnetic material having a sectional shape in the form of substantially letter E and the two excitation coils 32b, 32b provided within the E-shaped yoke 32a. Therefore, a prescribed electromagnetic field is generated by flowing a current through these excitation coils 32b, 32b to select a prescribed direction, an electromagnetic force is acted on the permanent magnet 31b of the clutch moving unit 31 by the generated magnetic field to move in a prescribed direction, and the dog clutch 21 having the clutch moving unit fixed can be stopped at a prescribed position. In other words, the dog clutch 21 can be moved to and stopped at one of the second-speed position, the neutral position, and the first-speed position. And, since the dog clutch 21 is operated by the electromagnetic force, it can be operated in electrical interconnection with the travelling motor.

And, since the yoke 32a is formed to have both ends thick in the axial direction, when the clutch moving unit 31 reaches the end of the moving stroke, an attraction force is produced between the permanent magnet 31b of the clutch moving unit 31 and the yoke 32a of the clutch drive unit 32, and a pushing force is constantly applied to the clutch moving unit 32 in the moving direction, namely in the direction that the dog clutch 21 is engaged. Therefore, when the clutch moving unit 31 reaches the end of movement, the dog clutch 21 can be kept in the pushed state without being returned to the neutral position even when the excitation coils 32b of the clutch drive unit 32 have the excitation eliminated. Therefore, at the end of the moving stroke of the clutch moving unit 31, the pushing force can be kept by the attracting magnetic force which pushes the clutch moving unit 31 in the moving direction even when the excitation coil is not excited, so that the operation of flowing a current through the excitation coils 32b may be performed only when the clutch moving unit 31 is to be moved, and power consumption in the clutch operation can be lowered to the bare minimum.

When the clutch is disengaged, namely the clutch moving unit 31 of the dog clutch 21 is returned to the neutral position or connected to the opposite gear, a current in the opposite direction is flown through the selected excitation coils 32b, 32b, the same action works in the same direction, and the clutch moving section 31 and the dog clutch 21 are moved.

Therefore, when the dog clutch 21 is to be engaged with the second-speed or first-speed dog clutch 26, 27, a prescribed current in the clutch switching direction is flown through the excitation coils 32b, 32b of the clutch drive unit 32, and a magnetic field is produced by the excitation coils 32b, 32b. And, this magnetic field acts on the permanent magnet 31b of the clutch moving unit 31, and the clutch moving unit 31 can be moved to the dog clutches 26, 27 on the selected second-speed or first-speed side through the neutral position.

And, a non-contact rotational speed sensor 34 using a Hall element is provided in the neighborhood of the motor output shaft 7a, and a rotational speed of the motor output shaft 7a is detected by this speed sensor 34 to control at the time of changing the speed to be described afterward. Similarly, a non-contact rotational speed sensor 35 is provided in the neighborhood of the driven shaft 5a to detect a rotational speed of the driven shaft 5a in order to control at the time of changing the speed and to output to the control circuit section.

The transmission device 20 is at least housed into a tightly closed container which is not shown, and the case interior is filled with a lubricant. And, the electric motor to be used is a DC brushless motor which excels in durability and reliability and mounted with its motor output shaft 7a horizontal in the same way as the driven shaft to which the propelling wheels are connected.

Besides, the operation of moving the clutch is controlled by the control circuit section. In other words, when travelling ordinarily, the control circuit section judges the travelling condition based on a traveling speed signal or the like from respective sensors, namely from the speed sensor 35 of the driven shaft 5a to automatically set the motor output or select the second speed or first speed of the transmission device. And, to change to the second speed or the first speed, the ordinary traveling mode is temporarily shifted to the speed change mode to smoothly engage or disengage the dog clutch, and the ordinary mode is resumed. This speed change mode comprises the output control of the motor performed by the control circuit section based on the traveling speed signal from the speed sensor 35 and the operation control of the dog clutch.

Figure 3:
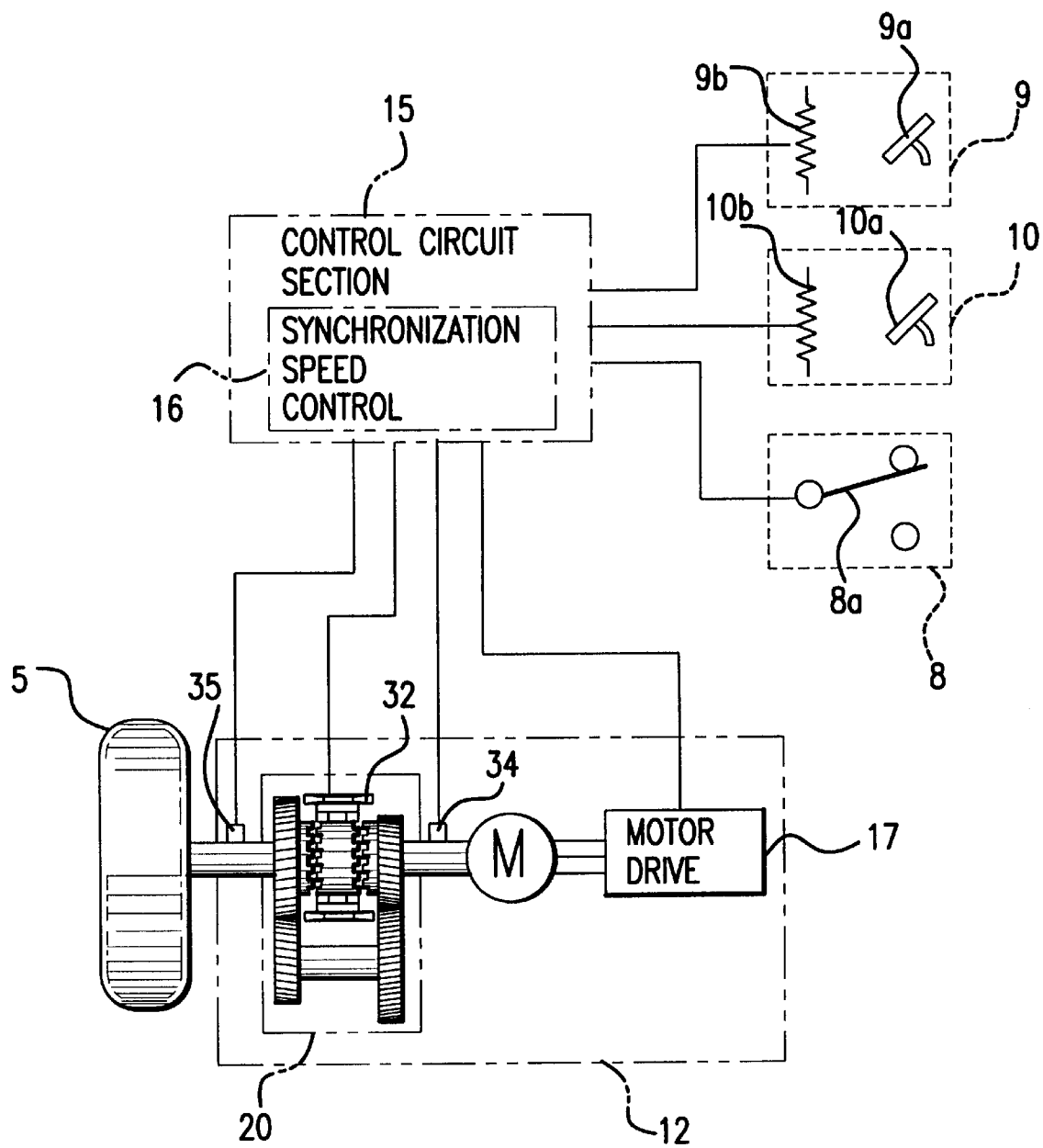
FIG. 3 is a concept block diagram for showing one example of the clutch control according to the invention.

In this embodiment, the control circuit section 15 is connected to a travel selection unit 8 which is provided in the vehicle cabin and operated by the driver, a motor drive circuit 17 which controls an accelerator 9, a brake 10 and a motor drive output, the speed sensor 34 for a traveling motor M, the speed sensor 35 for the driven shaft 5a, and the transmission device 20 as shown in FIG. 3. And, it has a microcomputer which receives an instruction signal based on a command by the driver and a sensor signal indicating the operation condition of equipment and outputs an operation command. This microcomputer has an A/D converter for converting respective input signals into digital signals, I/O ports, a CPU, a memory and the like as described above. And, processing is performed according to a program stored in the memory on the basis of operation of the accelerator or the brake by the driver or a detected signal from the speed sensor or the like, an appropriate operation command is outputted to the motor drive circuit and the transmission device 20, the motor output is controlled at the time of the ordinary traveling, and when the speed is to be changed, the motor output is controlled and the clutch operation of the transmission device 20 is controlled.

The travel selection unit 8 has an alternative selection lever 8a and a forward or reverse travel command signal is outputted by the driver operating the lever. And, the accelerator 9 has a variable resistor 9b connected to an accelerator pedal 9a to obtain an output voltage signal according to an accelerator operating level by the driver. Besides, the brake 10 similarly has a variable resistor 10b connected to a brake pedal 10a to obtain an output voltage signal according to a brake operating level by the driver.

And, the control circuit section 15 has a synchronization speed judging control 16. The synchronization speed judging control 16 is a control which receives the signals from the speed sensors 34, 35, compares the rotational speed of the second-speed or first-speed dog clutch 26, 27 with the rotational speed of the output clutch, namely dog clutch 21, and synchronizes the rotational speed of the second-speed or first-speed dog clutch 26, 27 with the rotational speed of the dog clutch 21.

Therefore, as will be described in detail afterward, after releasing the engaged connection of the clutches at the time of changing the speed, the rotational speed of the second-speed or first-speed dog clutch 26, 27 is synchronized with the rotational speed of the dog clutch 21 by the control circuit section 15 which has received the signal from the synchronization speed judging control 16 or by the synchronization speed judging control 16 which has been provided independent of the control circuit section 15, and the second-speed or first-speed dog clutch 26, 27 is engaged with the dog clutch 21. In this embodiment, the dog clutch 21 is shifted to be engaged with the second-speed or first-speed dog clutch 26, 27.

In this embodiment, speed change mode control means comprises the control circuit section. But, it is not exclusive, and a dedicated circuit device may be used to temporarily control the transmission device and the motor system from the control circuit section only in the speed change mode.

Now, description will be made of a speed change control embodiment.

When the electric vehicle of this embodiment is traveling at a high speed and it is necessary to shift from the second speed for the high-speed traveling down to the first speed, a shift down command is issued automatically or manually to change to an instantaneous speed change mode.

Figure 4A:
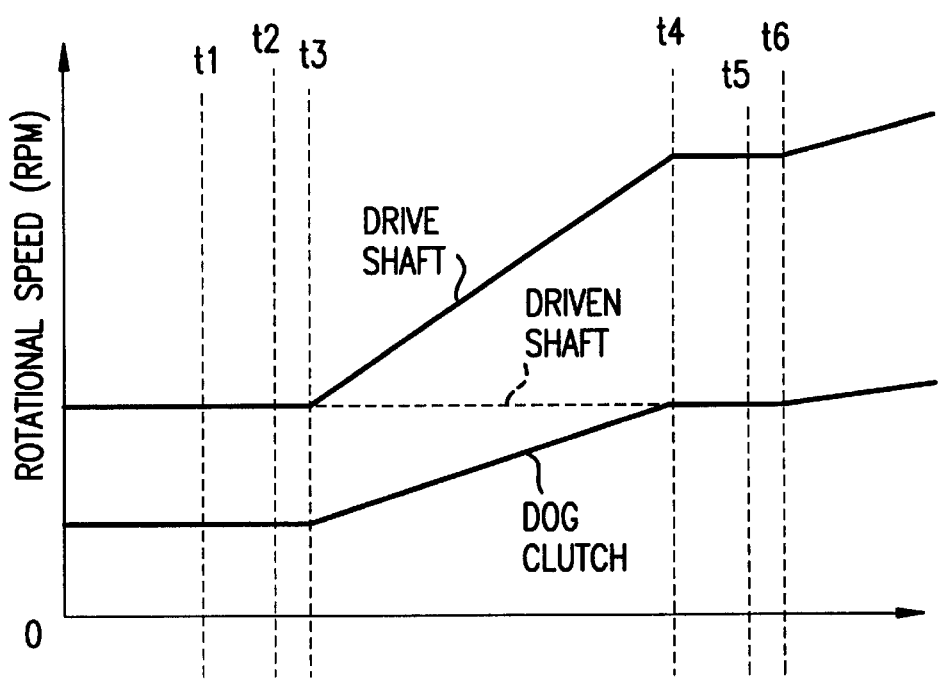
FIGS. 4a, 4b, and 4c are time charts for showing the operation procedures related to the transmission apparatus for the electric vehicle in a first embodiment; (a) is a speed chart showing the rotational speed of each shaft, (b) is a state diagram showing the operation position state of the driven dog clutch, and (c) is an output chart showing the output torque state of a motor.
Figure 4B:
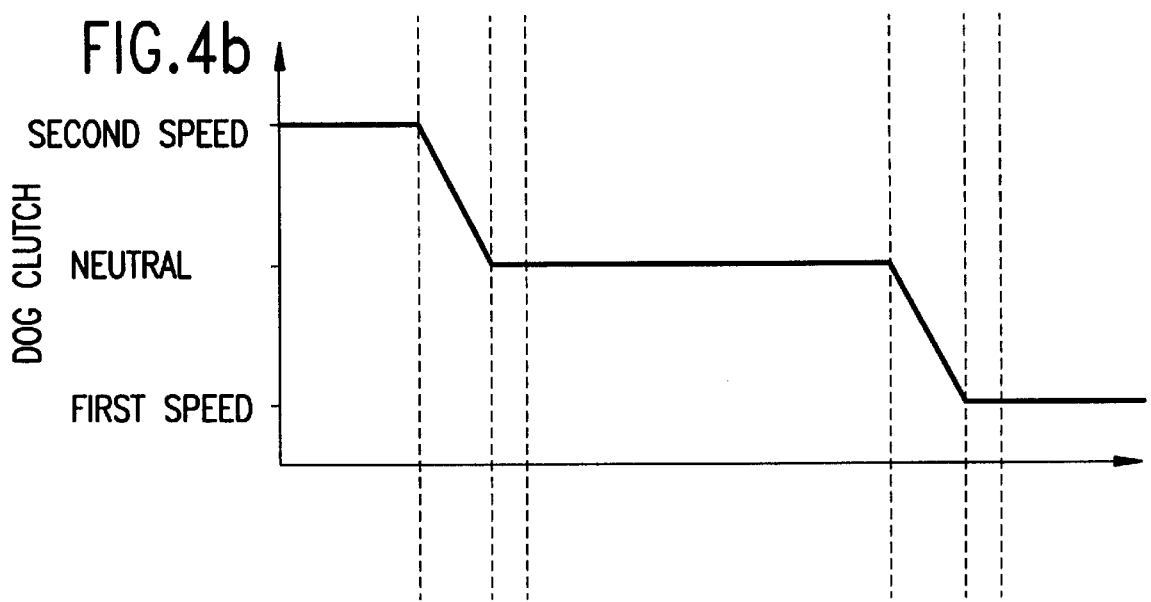
Figure 4C:
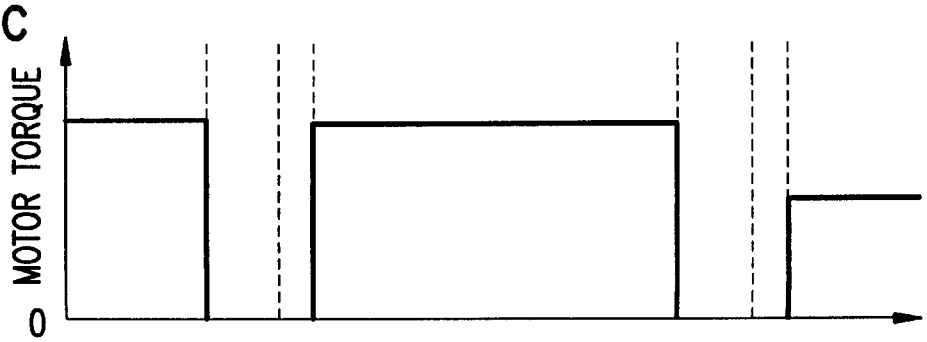

This speed change mode includes a six-stage procedure of from t1 to t6 as shown in FIG. 4(a) to (c). It is seen that the motor speed and torque control is performed in association with the dog clutch operation control.

First, the motor torque is controlled at t1. Specifically, the motor is put in a free-run state without being supplied with a current or the motor is kept in an operating state with electric power supplied sufficient to keep the immediately preceding rotational speed. In either case, torque transmitted from the drive side to the driven side is minimized. At the same time, a current is flown through the actuator 30 to control that the dog clutch 21 on the driven side is shifted to the neutral position. Therefore, since the output torque from the motor is minimized, the dog clutch 21 on the driven side which is in the engaged state with the dog clutch 26 on the drive side in the second speed state can be pulled out easily, namely the engagement of the dog clutches 21, 26 on the drive and driven sides can be released smoothly.

And, it is assumed that the dog clutch 21 on the driven side completes its shifting to the neutral position at t2, but this state is kept until the duration from t2 to t3, namely a predetermined margin time, terminates. Therefore, the dog clutch 21 can complete the shifting to the neutral position to release the engagement of the clutches under any conditions.

Then, at t3 where the margin time has elapsed, the motor speed is increased to a target speed. This target speed is set to a speed at which the dog clutch 27 fixed to the first-speed gear 25 becomes equal to the speed of the driven shaft 5a. Since the first-speed gear 25 is driven by the motor via the speed reduction gears 23, 24 which have been set to have a prescribed reduction gear ratio, the motor speed increased with the reduction gear ratio taken into account is required. Specifically, the rotational speed of the dog clutch 27 is calculated in view of a gear ratio and a motor speed which is detected by the speed sensor 34 on the motor side. On the other hand, the speed on the driven shaft 5a side is detected by the speed sensor 35 on the driven shaft 5a side, but since the total duration of the speed change mode is instantaneous and the driven shaft 5a is directly connected to the propelling wheels 5, the speed may not vary largely during this duration, and it is assumed to be operating at a prescribed constant speed. Therefore, the speed immediately before the speed change can be used, and the need for detecting the speed of the driven shaft 5a during the above duration can be eliminated. In other words, the speed curve indicating the rotational speed of the driven shaft 5a keeps the straight state until the ordinary traveling mode is resumed at t6, and the broken line section of the same speed curve indicates a state that neither of the clutches is connected as shown in FIG. 4(a).

And, at t4 where it is detected by the speed sensor 34 on the motor side that the dog clutch 27 accelerated by the motor has reached the target speed, the motor is again put in a free-run state with the motor supply electric power eliminated at that rotational speed or in a rotation keeping state with electric power supplied sufficient to keep the rotational speed, and a current is flown through the actuator 30 to control that the dog clutch 21 on the driven side is started to be shifted to the first speed side. Therefore, the speeds of the dog clutches 27, 21 on the drive and driven sides are substantially synchronized, so that connection can be made smoothly and a shock at the time of connecting the dog clutches can be reduced.

And, similar to t2, it is assumed that the dog clutch 21 on the driven side has been shifted to the first speed position to complete the clutch connection at t5, but this state is designed to be kept for the duration of from t5 to t6, namely until the expiration of the predetermined margin time.

Therefore, the dog clutch 21 on the driven side can surely complete the shifting to the first speed position and the connection can be completed under any conditions.

Then, at t6 where the margin time has elapsed, the speed change mode terminates, the ordinary traveling mode is resumed, and the motor output control is performed in accordance with the operation of the accelerator by the driver to accelerate or decelerate the vehicle.

In this embodiment, in addition to the provision of the speed reduction gear mechanism on the motor drive side, the dog clutch which is selectively connected to this gear is provided on the driven side, but the opposite arrangement can also be made.

In order to attain the cost reduction and reliability to be described afterward, a position sensor is not provided to check the shifted position of the dog clutch, but the margin time is determined for each shifting operation of the dog clutch. If a position sensor is provided, the need for this margin time can be eliminated.

As described above, the transmission device of this embodiment can comprise dog clutches which have a simple structure, can be produced inexpensively, and have good durability. And, it can provide highly efficient transmitting performance as compared with the hydraulic transmission and the continuously variable transmission. Namely, since the dog clutch which is one type of the jaw clutch operated by electromagnetic force and the drive and driven sides are mechanically engaged to transmit the drive force, highly efficient transmission efficiency can be achieved. For example, this jaw clutch can improve the transmission efficiency to about 90% or more as compared with the transmission efficiency of 70% by the conventional frictional transmission by a V-belt. This is because in the case of the belt transmission, a large transmission loss is caused due to slip, friction, deformation of the belt during transmission, while such a loss is quite small in the transmission by engagement.

And, since the engagement and disengagement of the clutch is electrically performed by the electromagnetic force, the clutch operation performance can be improved by keeping the electrical connection with the motor. Specifically, when the clutch is engaged or disengaged, since the motor torque and speed can be instantaneously changed to an appropriate level and controlled according to the clutch operation signal, the engagement, connection or disengagement of the shifting clutches can be made smoothly and the secure and comfortable clutch operating feeling can be obtained, and the clutch engagement and disengagement performance can be improved.

Furthermore, the speed detection means on the drive side can also serve as speed detection means such as an encoder previously provided for the motor, and simplification can be made. And, the speed detection means on the driven side can also serve as a speed meter for judging a running speed of the vehicle.

Figure 5A:
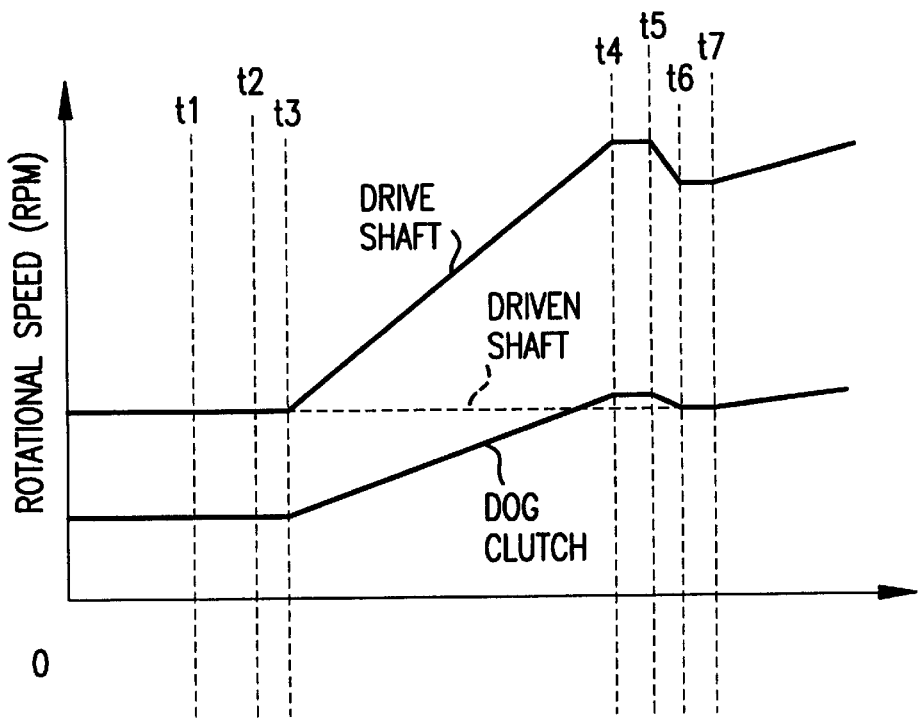
FIGS. 5a, 5b, and 5c are time charts for showing the operation procedures related to the transmission apparatus for the electric vehicle in a second embodiment; (a) is a speed chart showing the rotational speed of each shaft, (b) is a state diagram showing the operation position state of the driven dog clutch, and (c) is an output chart showing the output torque state of a motor.
Figure 5B:
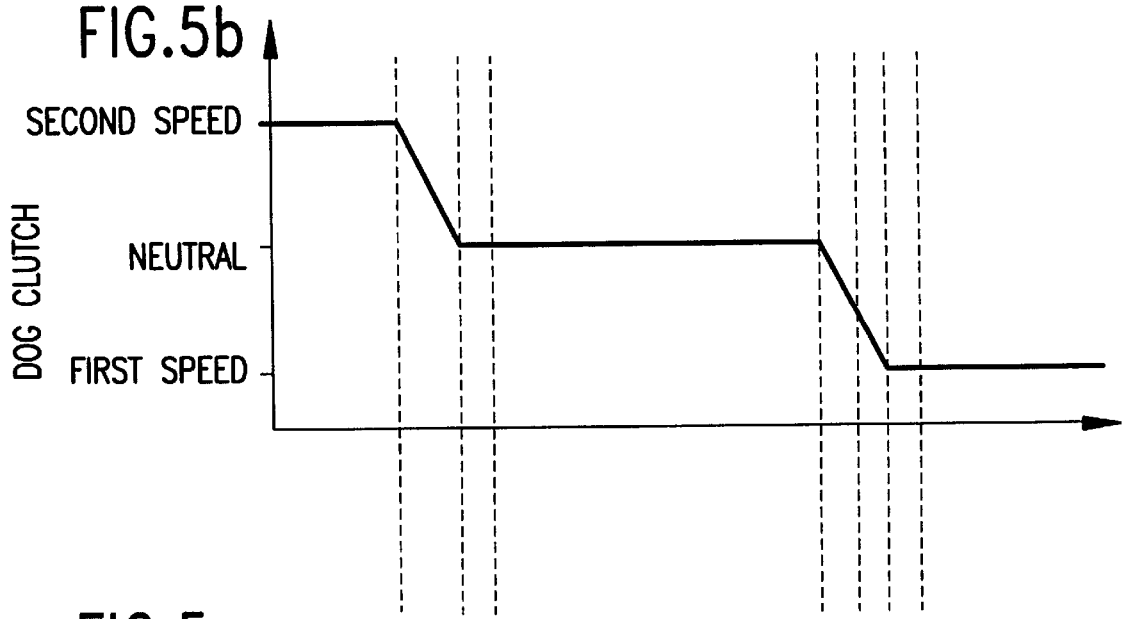
Figure 5C:
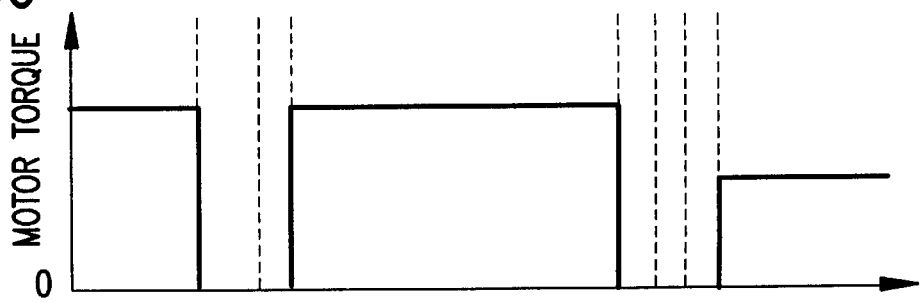

Now, description will be made of a second speed change control embodiment with reference to FIG. 5.

The speed change control in this embodiment connects the dog clutch on the driven side to the dog clutch on the motor drive side in the speed change mode with a prescribed difference between the rotational speed on the motor drive side and the rotational speed on the driven side. And, this speed difference is so determined that the drive side is faster. Therefore, when the dog clutches are connected to start the vehicle from its stopped state, the motor is prevented from revolving in the reverse direction, and when shifting down or accelerating, a shock similar to one felt when braking is prevented from taking place. The control from t1 to t3 in the speed change mode in each embodiment to be described afterward is the same as in the above-described first embodiment, and its description will be omitted.

In this second embodiment, at t3 through the same procedure as in the first embodiment, the motor speed is increased to the target speed in the same way as in the first embodiment, but this target speed is determined to be slightly faster than the driven side which is different from the first embodiment. This target speed is set to a speed so that the dog clutch 27 which is driven at the motor speed lowered by the reduction gears is slightly faster than the dog clutch 21 on the driven side which is operating at a constant speed. In other words, this speed difference is set to be larger than the rotational speed difference to deviate the dog clutches 21, 27 by a single tooth in the circumferential direction between t5 and t6 to be described afterward. For example, when the rotational speed on the driven side is 1000 RPM, the rotational speed on the drive side is quite low as 1010 to 1020 RPM.

And, at t4 where it is detected and calculated by the speed sensor 34 on the motor side that the dog clutch 27 on the drive side accelerated by the motor has reached the target speed slightly higher than the speed on the driven side, the motor falls again in a free-run state with the motor supply electric power eliminated at that rotational speed or in a rotation keeping state with electric power supplied sufficient to keep the rotational speed, and a current flown through the actuator 30 is controlled, so that the dog clutch 21 on the driven side is started to be shifted to the first speed side.

Then, before reaching t5 at least, the leading end of the dog clutch 21 in the shifting direction contacts to the tooth tip of the dog clutch 27 on the first speed drive side, and the dog clutches 21, 27 do not mutually engage substantially at t5 in view of the probability, the dog clutch 21 stops moving toward the first speed side, but the engagement is completed before reaching t6.

Specifically, the teeth 21a, 27a of the dog clutches 21, 27 are mutually contacted between t5 and t6, and the speed of the dog clutch 27 on the motor drive side is decreased, but the dog clutches 21, 27 are properly engaged without fail before t6, because they are deviated by the single tooth due to the speed difference.

Therefore, since the speed on the drive side is slightly higher than the speed on the driven side, even when the teeth of the dog clutches are mutually contacted which happens often in view of the probability, they can be deviated to the position to be properly engaged mutually and connected by a relative difference in angle of rotation between them. And, at this time, the speed difference between them is slightly larger to deviate the dog clutches by one tooth, so that a shock at the time of connecting the dog clutches can be lowered. Besides, since the speed on the drive side is slightly faster than the speed on the driven side, the connection shock can be directed toward the moving direction, and a discomfort feeling at the time of speed change can be relieved.

And, in the same way as t2, the shift of the dog clutch 21 on the driven side toward the first speed side is completed at t6, and the connection of clutches is considered completed. But, this state is retained for the duration from t6 to t7, namely until the termination of a predetermined margin time. And, at t7 where this margin time has elapsed, the speed change traveling mode completes, the normal traveling mode is resumed, and according to the operation of the accelerator by the driver, the motor output is controlled to accelerate or decelerate the vehicle.

As described above, the speed change control in the second embodiment has the same effects as in the first embodiment and provides a slight difference in rotational speed between the dog clutches to be engaged, so that the reliability of engagement can be improved.

And, since the difference in rotational speed is determined so that the rotational speed of the dog clutch on the drive side to be connected is set to be slightly faster than the rotational speed of the dog clutch on the driven side, the direction in which a shock is produced at the time of connecting the clutches can be directed toward the traveling direction, and a discomfort feeling at the time of speed change can be relieved.

Figure 7:
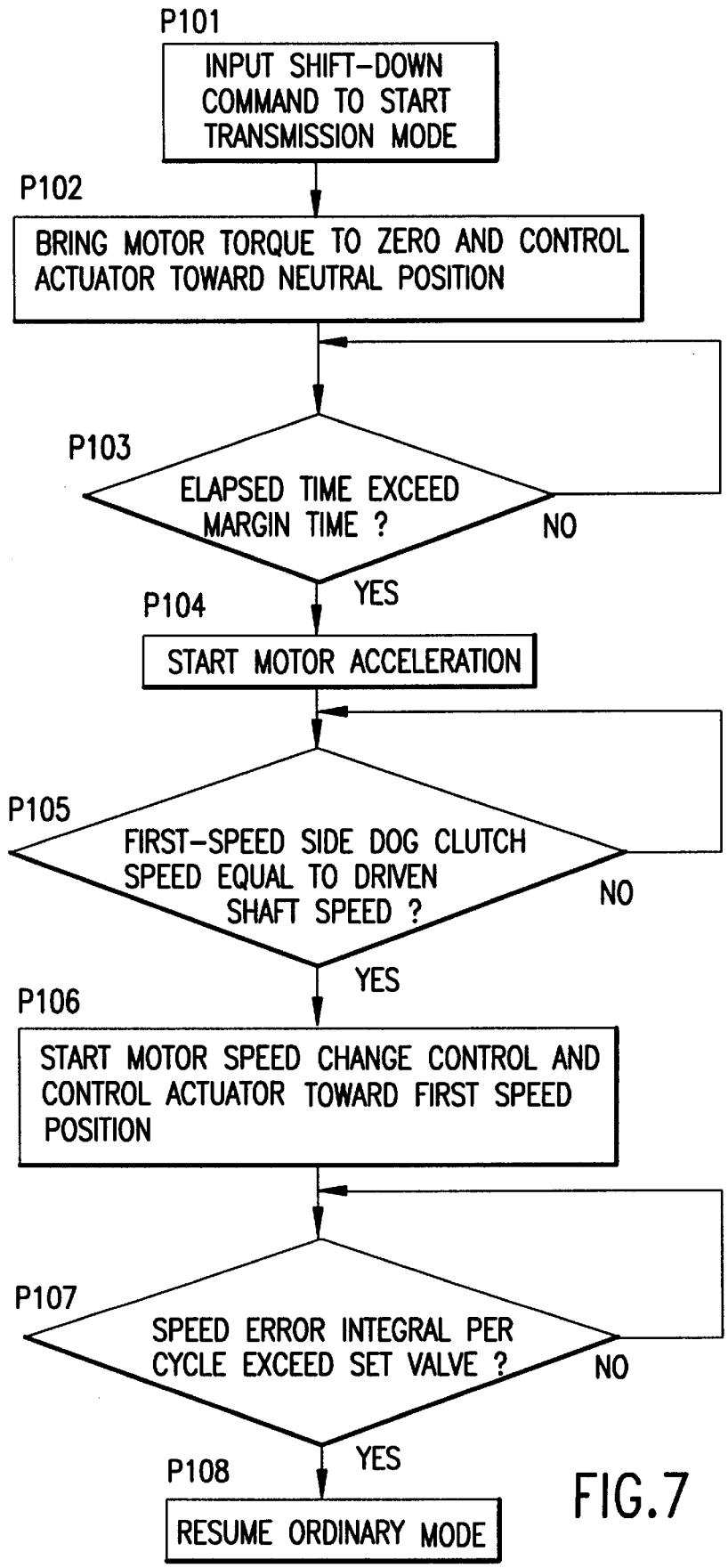
FIG. 7 is a flowchart for showing a control program related to the transmission apparatus for the electric vehicle in the third embodiment in a speed change mode thereof.
Figure 8B:
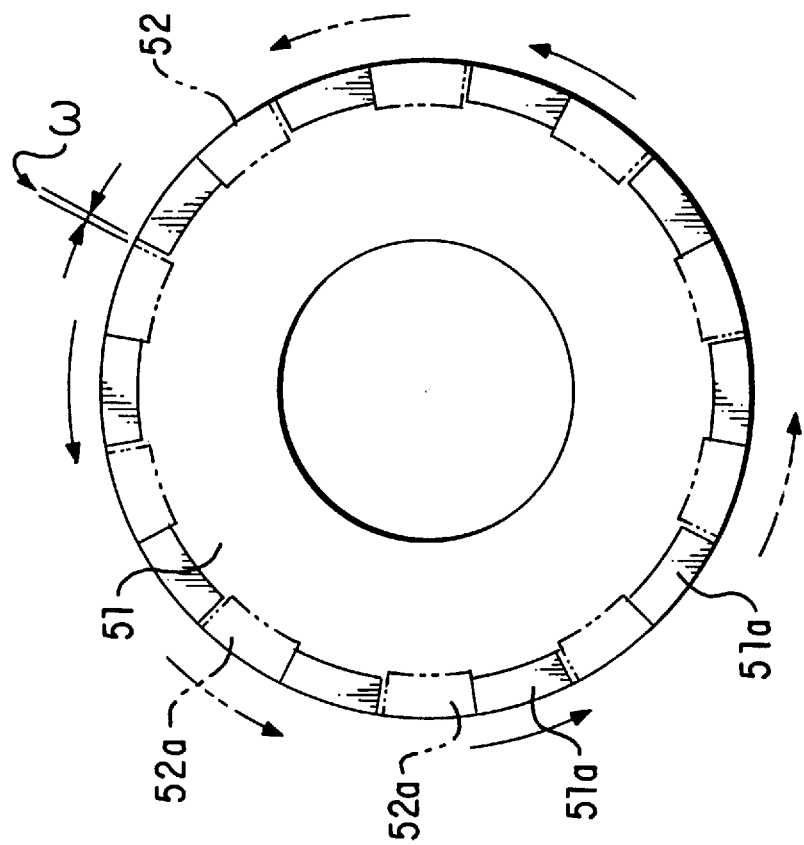
FIG. 8a is an explanatory side view and FIG. 8b is an explanatory axial view for describing the relation between conventional dog clutches on drive and driven sides.
Figure 8A:
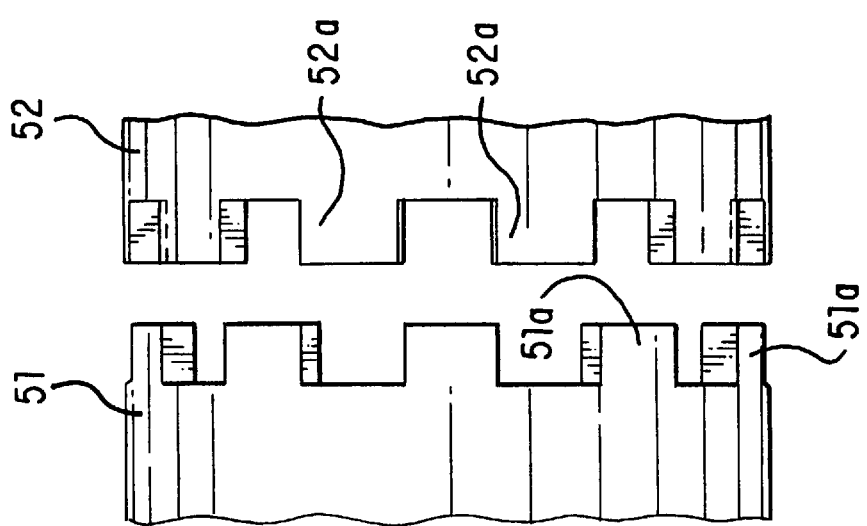
Figures 9A, 9B:
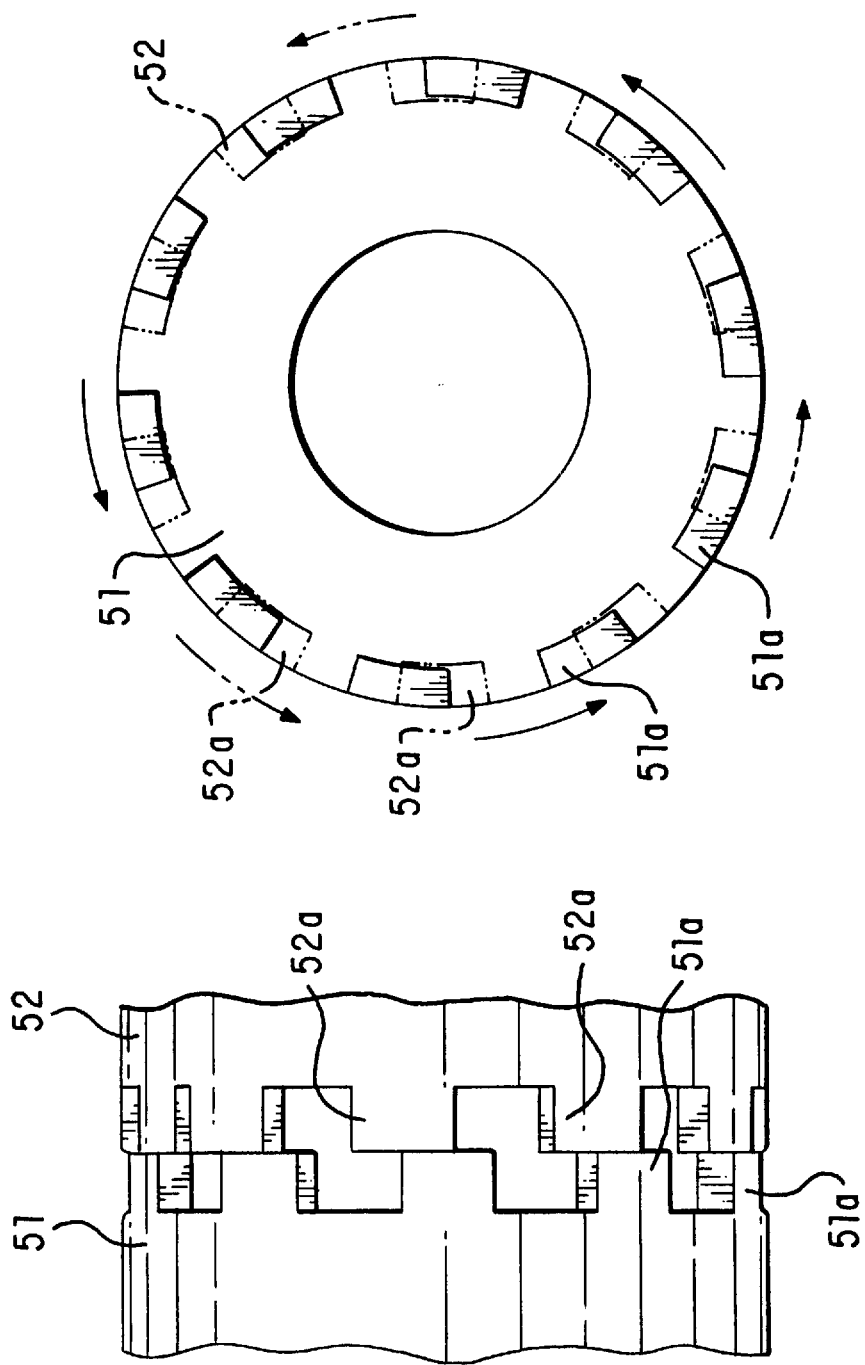
FIG. 9a is an explanatory side view and FIG. 9b is an explanatory axial view for describing a state of engaging conventional dog clutches on drive and driven sides.

Furthermore, the speed change control in a third embodiment will be described with reference to FIG. 6 and FIG. 7.

The speed change control in this embodiment detects the positions of dog clutches without a sensor. Specifically, at the time of connecting the clutches, the motor speed is changed with the output torque limited, and it is detected that the motor speed change is not controlled as expected, thereby assuming that the dog clutches have been connected and performing the control.

Specifically, the motor speed is increased to the target speed in the same way as in the first embodiment at t3 through the same procedure as in the first embodiment as shown in FIG. 6. This target speed is set to a speed so that the speed of the dog clutch 27 which is driven with the speed decreased by the reduction gears becomes equal to the speed of the driven shaft.

Then, when the motor speed reaches the target speed at t4 and the speed of the dog clutch 27 becomes equal to the speed of the driven shaft, the motor speed changing control in a prescribed cycle is started with the speed of the driven shaft as the lower limit. To perform the speed change control with the speed of the driven shaft as the lower limit, a shock similar to one felt when braking at the clutch engagement can be prevented from taking place. And, this speed change is controlled with the supply electric current limited and the torque upper limit defined and set to a speed change rate fully performable in this torque range. At the same time, the flow of an electric current through the actuator 30 is controlled, and the shift of the dog clutch 21 on the driven side toward the first speed side is started.

And, at t5, the dog clutch 21 moves for a clearance in the axial direction, but in the same way as in the second embodiment, the leading end of the dog clutch 21 toward to moving direction contacts to the tooth end of the dog clutch 27 on the first speed side, and the dog clutch 21 stops moving toward the first speed side. In other words, at t5, the dog clutches 21, 27 are hardly engaged mutually for the first time in view of the probability, and they are completely engaged before t8.

When the motor speed change is controlled with the tooth ends of the dog clutches contacted in the duration from t5 to t6, they are securely deviated to the proper engaging position because of a relative difference in speed between them, so that the dog clutches 21, 27 are engaged.

When these dog clutches are properly connected at t6, the speed change control can not be performed, the completion of connecting is detected to judge that the dog clutches have been connected. Specifically, after the clutch connection, to perform the speed change by the speed change control, the motor output torque high enough to accelerate or decelerate the vehicle is required. But, since the upper limit of the torque is previously determined to be small by limiting the electric current, the speed of the drive shaft 7a cannot be changed, and an error in the speed control detected by the speed sensor 34 on the motor side is increased. In other words, a difference between the actually detected speed and the expected speed controlled is increased. When this control error is detected and integration is made, and the integrated value becomes a prescribed value or higher, it is determined that the clutch connection has been completed, and the ordinary travelling mode is resumed.

Specifically, the dog clutch 21 on the driven side is engaged with the dog clutch 27 on the second speed drive side at t6, and the speed of the dog clutch 27 on the drive side becomes equal to that of the driven shaft 5a. And, at this point, since the electrification control to the actuator 30 toward the second speed side is retained, the dog clutches are completely engaged at the following t7. And, in the duration from t6 to t8, one cycle of the speed change control with the clutches in the connected state passes, and a control error exceeds a set value.

Lastly, at t8 where the control error during the speed change detected becomes a prescribed integral or higher and it is detected that the clutch connection has been completed, the speed change mode is terminated and the electrification control to the actuator 30 is stopped. And, the ordinary traveling mode is resumed, and the speed control of the motor is performed according to the operation of the accelerator by the driver to accelerate or decelerate the vehicle.

Now, the drive control of the transmission device 20 in the third embodiment will be described with reference to the flowchart shown in FIG. 7.

In the above-described drive control, when a shift-down command is issued automatically or manually in step P101, the speed change mode is started, and the control procedure shown in the remaining steps P102 to P107 is performed in the speed change mode.

In step P102, the motor output is controlled, and the motor output torque is minimized. In other words, the motor is put in a free-run state with the motor supply electric power eliminated at that rotational speed or in a rotation keeping state with electric power supplied sufficient to keep the rotational speed. Thus, the output torque of the motor is minimized and the torque transmitted from the drive side to the driven side is minimized, so that the second speed engagement of the dog clutches 26, 21 can be released smoothly. At the same time, the electrification control is performed to the actuator 30 in order to shift the dog clutch 21 to the neutral position, and the dog clutch 21 starts to move to the neutral position.

Then, the process goes to step P103. In step P103, it is judged whether or not the elapsed time from the shift start time of the dog clutch 21 has become a prescribed margin set time. If not, step P103 is resumed, and if it has, the process goes to step P104. Therefore, since the prescribed margin time is secured, the engagement of the dog clutch 21 can be released with reliability.

In step P104, the rotational speed of the motor is started to be accelerated.

Then, in step 105, it is judged whether or not the acceleration has terminated, namely the speed of the dog clutch 27 has become equal to the speed of the driven shaft, and if the acceleration has terminated, the process goes to step P106. And, if not, the process returns to step P105, and the acceleration is continued. Specifically, it is judged whether or not the speed of the dog clutch 27 which is connected to the motor via the speed reduction gear train having a prescribed reduction gear ratio and decelerated to a prescribed speed by the motor has become equal to the speed of the driven shaft which is considered to be operating at a constant speed.

In step P106, the motor acceleration is terminated, and the motor speed change is started to be controlled. Specifically, the speed change control is performed upon changing the motor speed in a prescribed cycle with the driven shaft speed at the lower limit and determining the torque upper limit by limiting the supply electric current. And, the motor speed variation coefficient is set to a value fully executable within the limited torque range. At the same time, the electrification control is performed to the actuator 30 in order to shift the dog clutch 21 to the first speed position, and the dog clutch 21 starts to move to the first speed position. And, the process goes to step P107, and it is judged in view of the speed change control whether or not the dog clutch 21 is engaged with the dog clutch 27 on the first speed drive side.

In other words, the dog clutch 21 is thoroughly connected owing to the difference in angle of rotation of the dog clutch 21 by the speed change control in step P107. When the connection of the dog clutch 21 is completed, the speed change control cannot be performed, and the completion of connecting the dog clutch 21 is judged by detecting the condition of the speed change control. Specifically, to perform the speed change by the speed change control after the clutch connection, torque high enough to accelerate or decelerate the vehicle is required. But, since the upper limit value of the torque is previously determined to be small, an error in the speed control to be detected by the speed detection means on the motor side becomes high. This control error is detected and integrated. When the integral becomes a prescribed value or higher, it is considered that the operation of connecting the dog clutch 21 has completed, and the process goes to step P108.

And, in step P108, the speed change mode is terminated, and the ordinary traveling mode is resumed. And, the speed control of the motor is performed according to the operation of the accelerator by the driver to accelerate or decelerate the vehicle.

As described above, by the speed change control in the third embodiment, the same effects as in the first embodiment can be obtained, and the speed of the motor having its output torque limited at the time of the clutch connection is varied to detect that the change control of the motor speed can not be performed as expected, thereby judging the completion of the dog clutch connection. Thus, the completion of the clutch connection can be judged without a sensor.

And, a sensor for detecting the dog clutch position and electrical wiring for connecting such a sensor to the control circuit are not needed, so that a cost is reduced, and it is not necessary to provide the sensor in the neighborhood of the clutch where the operation environment is severe for the sensor. Therefore, reliability of the transmission can be improved.

What is claimed is:

1. A variable speed driving method for an electric vehicle provided with an electric motor for propelling, a motor drive circuit for controlling the drive power of the motor, and a control circuit section for outputting an operation command to the motor drive circuit, comprising the steps of:

providing a transmission apparatus which engages or disengages a drive shaft which receives the drive force from the propelling motor and a driven shaft which is interconnected with propelling wheels by an electromagnetic clutch, wherein said electromagnetic clutch comprised of a first clutch interconnected with the drive shaft, a second clutch having a rotational speed different from the first clutch, and an output side clutch interconnected with the driven shaft;

releasing an operation command to said motor drive circuit at a time of shifting gears to release clutch engagement, reissuing an operation command to said motor drive circuit to increase the rotational speed of said first or second clutch slightly higher than the rotational speed of the output side clutch, and engaging said first or second clutch with the output side clutch.

2. A variable speed driving method for an electric vehicle provided with an electric motor for propelling, a motor drive circuit for controlling the drive power of the motor and a control circuit section for outputting an operation command to the motor drive circuit, comprising the steps of:

providing a transmission apparatus which engages or disengages a drive shaft which receives the drive force from the propelling motor and a driven shaft which is interconnected with propelling wheels by an electromagnetic clutch, wherein said electromagnetic clutch comprised of a first clutch interconnected with the drive shaft, a second clutch having a rotational speed different from the first clutch, and an output side clutch interconnected with the driven shaft;

adding a speed changing control in a prescribed cycle with the rotational speed of said output side clutch as a lower limit to synchronized rotation of said first or second clutch, and judging, when a speed control error in the speed changing control becomes a prescribed value or higher, that said first or second clutch has been engaged with the output side clutch.

* * * * *